United States Patent
Moon et al.

(10) Patent No.: US 12,022,200 B2
(45) Date of Patent: Jun. 25, 2024

(54) METHOD FOR MEASURING ILLUMINANCE USING CAMERA AND SUPPORTING THE SAME

(71) Applicant: Samsung Electronics Co., Ltd., Suwon-si (KR)

(72) Inventors: Inah Moon, Suwon-si (KR); Kawang Kang, Suwon-si (KR); Dongsoo Kim, Suwon-si (KR); Jaehyoung Park, Suwon-si (KR); Shuichi Shimokawa, Suwon-si (KR); Yeotak Youn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/710,808

(22) Filed: Mar. 31, 2022

(65) Prior Publication Data
US 2022/0321754 A1  Oct. 6, 2022

Related U.S. Application Data

(63) Continuation of application No. PCT/KR2022/004615, filed on Mar. 31, 2022.

(30) Foreign Application Priority Data

Mar. 31, 2021  (KR) .................. 10-2021-0042386

(51) Int. Cl.
*H04N 23/71* (2023.01)
*G01J 1/42* (2006.01)
(Continued)

(52) U.S. Cl.
CPC ............ *H04N 23/71* (2023.01); *G01J 1/4204* (2013.01); *G09G 3/20* (2013.01); *H04N 5/2628* (2013.01);
(Continued)

(58) Field of Classification Search
CPC ...... H04N 23/71; H04N 5/2628; H04N 23/51; H04N 23/53; H04N 23/73; H04N 23/57;
(Continued)

(56) References Cited

U.S. PATENT DOCUMENTS 7,825,891 B2   11/2010   Yao et al.
8,194,031 B2    6/2012   Yao et al.
(Continued)

FOREIGN PATENT DOCUMENTS

JP   2006-093840 A    4/2006
KR   10-1030066 B1    4/2011
(Continued)

OTHER PUBLICATIONS

International Search Report and Written Opinion dated Jul. 19, 2022 in connection with International Patent Application No. PCT/KR2022/004615, 9 pages.

*Primary Examiner* — Jason A Flohre

(57) ABSTRACT

According to an embodiment disclosed in this specification, an electronic device may include a camera including an image sensor, a display panel, a display driver integrated circuit (DDI) that drives the display panel at a first frame rate, a memory, and a processor operatively connected to the camera, the display panel, the DDI, and the memory. The DDI may drive the display panel in a plurality of cycles to output one frame corresponding to the first frame rate. The camera may perform exposure of the image sensor in a section, in which one or more lines among lines constituting the display panel do not emit light, in the plurality of cycles. The memory may store instructions that, when executed, cause the processor to determine illuminance around the electronic device using image data according to the exposure. Moreover, various embodiment found through the disclosure are possible.

19 Claims, 9 Drawing Sheets

(51) Int. Cl.
*G09G 3/20* (2006.01)
*H04N 5/262* (2006.01)
*H04N 23/51* (2023.01)
*H04N 23/53* (2023.01)
*H04N 23/73* (2023.01)

(52) U.S. Cl.
CPC ............ *H04N 23/51* (2023.01); *H04N 23/53* (2023.01); *H04N 23/73* (2023.01); *G09G 2320/0626* (2013.01); *G09G 2340/0435* (2013.01); *G09G 2360/144* (2013.01)

(58) Field of Classification Search
CPC ....... H04N 23/63; H04N 23/72; G01J 1/4204; G09G 3/20; G09G 2320/0626; G09G 2340/0435; G09G 2360/144; G09G 2230/00; G09G 2310/0213; G09G 2370/08
See application file for complete search history.

(56) References Cited

U.S. PATENT DOCUMENTS

| | | | |
|---|---|---|---|
| 8,890,798 B2 | 11/2014 | Yao et al. | |
| 9,024,530 B2 | 5/2015 | Land et al. | |
| 9,706,126 B2* | 7/2017 | Cho | H04N 21/485 |
| 10,191,577 B2 | 1/2019 | Choi et al. | |
| 10,554,869 B2 | 2/2020 | Zhou et al. | |
| 11,125,610 B2 | 9/2021 | Yoon et al. | |
| 2007/0279369 A1 | 12/2007 | Yao et al. | |
| 2014/0132158 A1 | 5/2014 | Land et al. | |
| 2014/0204260 A1* | 7/2014 | Ha | G09G 3/00 348/333.01 |
| 2015/0049211 A1* | 2/2015 | Lim | H04N 23/90 348/211.1 |
| 2016/0219217 A1* | 7/2016 | Williams | H04N 23/632 |
| 2017/0235398 A1 | 8/2017 | Choi et al. | |
| 2017/0244875 A1* | 8/2017 | Kwak | H04N 23/74 |
| 2017/0263212 A1* | 9/2017 | Chae | G06F 3/1423 |
| 2018/0063435 A1 | 3/2018 | Cho et al. | |
| 2018/0183913 A1* | 6/2018 | Kwak | G06F 1/1698 |
| 2018/0324342 A1 | 11/2018 | Zhou et al. | |
| 2018/0348049 A1* | 12/2018 | Yoon | G09G 3/3406 |
| 2019/0166297 A1* | 5/2019 | Kwak | H04N 23/57 |
| 2019/0261519 A1* | 8/2019 | Park | H04M 1/0268 |
| 2020/0279519 A1* | 9/2020 | Orio | G09G 3/006 |
| 2020/0322560 A1* | 10/2020 | Haraguchi | H04N 25/772 |
| 2022/0368833 A1* | 11/2022 | Kanai | H04N 23/63 |

FOREIGN PATENT DOCUMENTS

| | | |
|---|---|---|
| KR | 10-2018-0024299 A | 3/2018 |
| KR | 10-2018-0131848 A | 12/2018 |
| KR | 10-2019-0077576 A | 7/2019 |
| KR | 10-2020-0072845 A | 6/2020 |

\* cited by examiner

METHOD FOR MEASURING ILLUMINANCE USING CAMERA AND SUPPORTING THE SAME

CROSS-REFERENCE TO RELATED APPLICATIONS

This application is a continuation of International Application No. PCT/KR2022/004615 filed on Mar. 31, 2022, which claims priority to Korean Patent Application No. 10-2021-0042386 filed on Mar. 31, 2021, in the Korean Intellectual Property Office, the disclosures of which are herein incorporated by reference in their entirety.

BACKGROUND

1. Field

Various embodiments of this specification relate to a method of measuring illuminance by using a camera, and an electronic device supporting the same.

2. Description of Related Art

An electronic device such as a smartphone or a tablet PC may include a camera module (or a camera or a camera device). The electronic device may capture a photo or a video through the camera module.

Nowadays, a region occupied by a display on a front surface of the electronic device is gradually increasing. In a configuration such as a camera module, an illuminance sensor (e.g., an ambient light sensor (ALS)), a fingerprint sensor, or a speaker, a region occupied on the front surface of the electronic device may be minimized or may be disposed under a display panel so as to be mounted in the electronic device in a hidden shape that makes it difficult to be perceived from the outside.

An electronic device may replace a function of an illuminance sensor by using a camera. When the camera is positioned in a non-active region that is placed outside an active region of a display panel, or when the camera is exposed through a hole formed in the display panel, the camera may not be affected by the emission of the display panel while measuring illuminance by using the camera.

For an under-display-camera (UDC), when an image sensor is disposed under an active region of the display panel, the image sensor may be affected by the light emission of the display panel while measuring illuminance by using the camera. Because light output from the display panel enters the image sensor, it may be difficult to accurately measure the ambient illumination. To prevent this issue, a method for reducing light interference by processing a region overlapping the image sensor so as to be black (display is turned off) has been attempted. In this case, a flicker may be visually perceived in an upper region of the image sensor depending on a driving method of a display panel.

A supplementary method of placing a separate illuminance sensor under a display is also being attempted. However, the performance of the illuminance sensor may be degraded on a bottom surface of the display panel.

SUMMARY

Various embodiments in this specification may provide an electronic device that measures illuminance by synchronizing the exposure timing of a UDC with the non-emission time of a display panel.

An electronic device may include a camera including an image sensor, a display panel, a display driver integrated circuit (DDI) that drives the display panel at a first frame rate, a memory, and a processor operatively connected to the camera, the display panel, the DDI, and the memory. The DDI may drive the display panel in a plurality of cycles to output one frame corresponding to the first frame rate. The camera may perform exposure of the image sensor in a section, in which one or more lines among lines constituting the display panel do not emit light, in the plurality of cycles. The memory may store instructions that, when executed, cause the processor to determine illuminance around the electronic device using image data according to the exposure.

An electronic device according to various embodiments disclosed in the specification may accurately measure illuminance by synchronizing the exposure timing of a UDC with the non-emission time of a display panel.

The electronic device according to various embodiments disclosed in the specification may increase the accuracy of the illuminance measurement by using the UDC having a wider field of view (FOV) and higher transmittance than an illuminance sensor. The electronic device may not include a separate illuminance sensor. Accordingly, a material cost may be reduced, and an illuminance sensor may not be visually perceived from the outside.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, the same or similar components will be marked by the same or similar reference signs.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to the description of drawings, similar components may be marked by similar reference marks/numerals.

Figure 1:
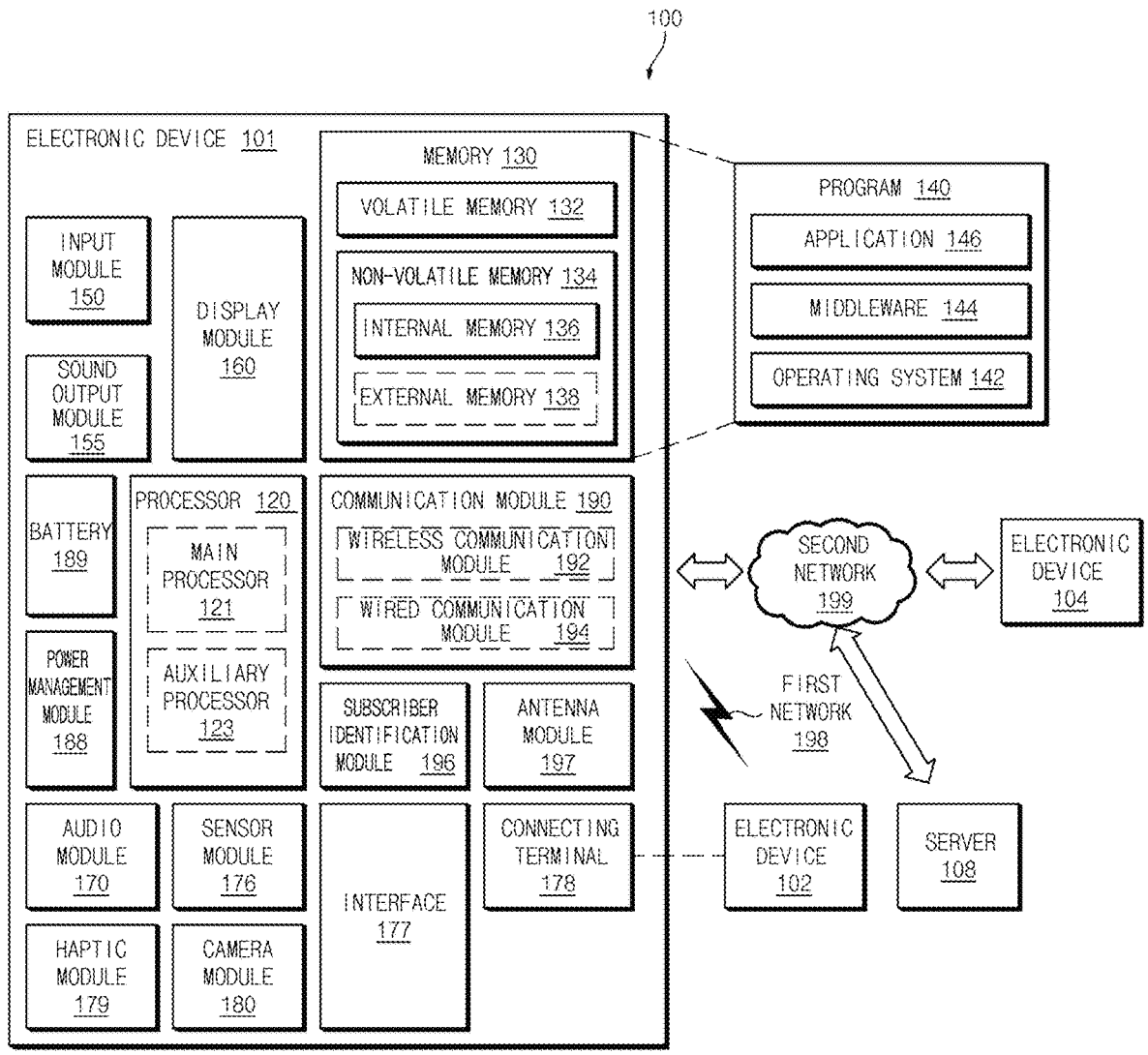
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
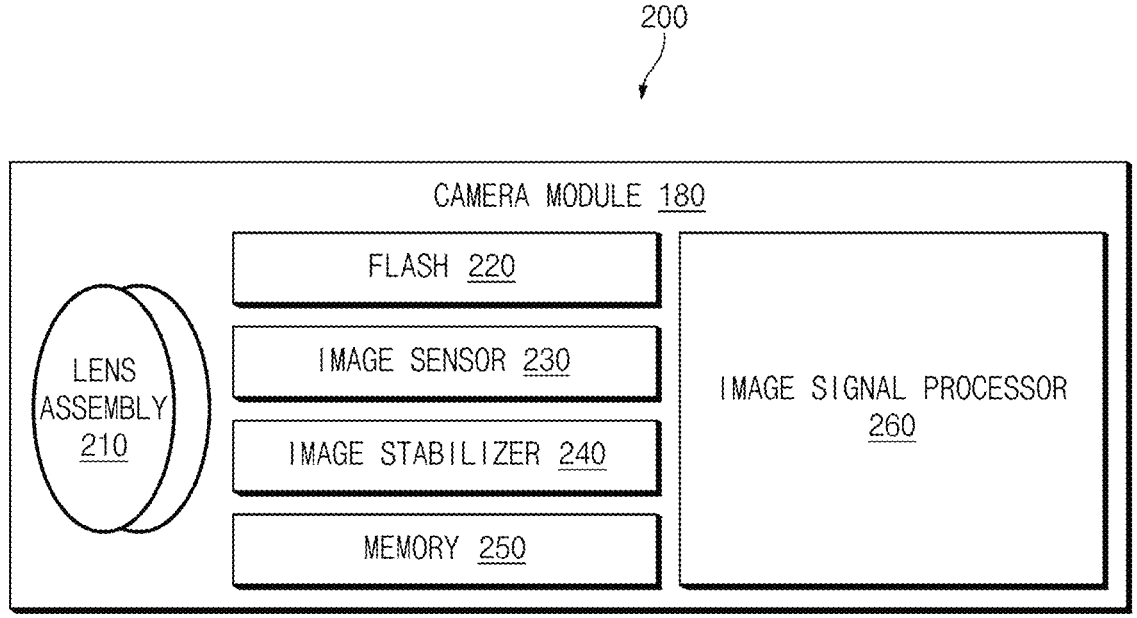
FIG. 2 is a block diagram illustrating a camera module, according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
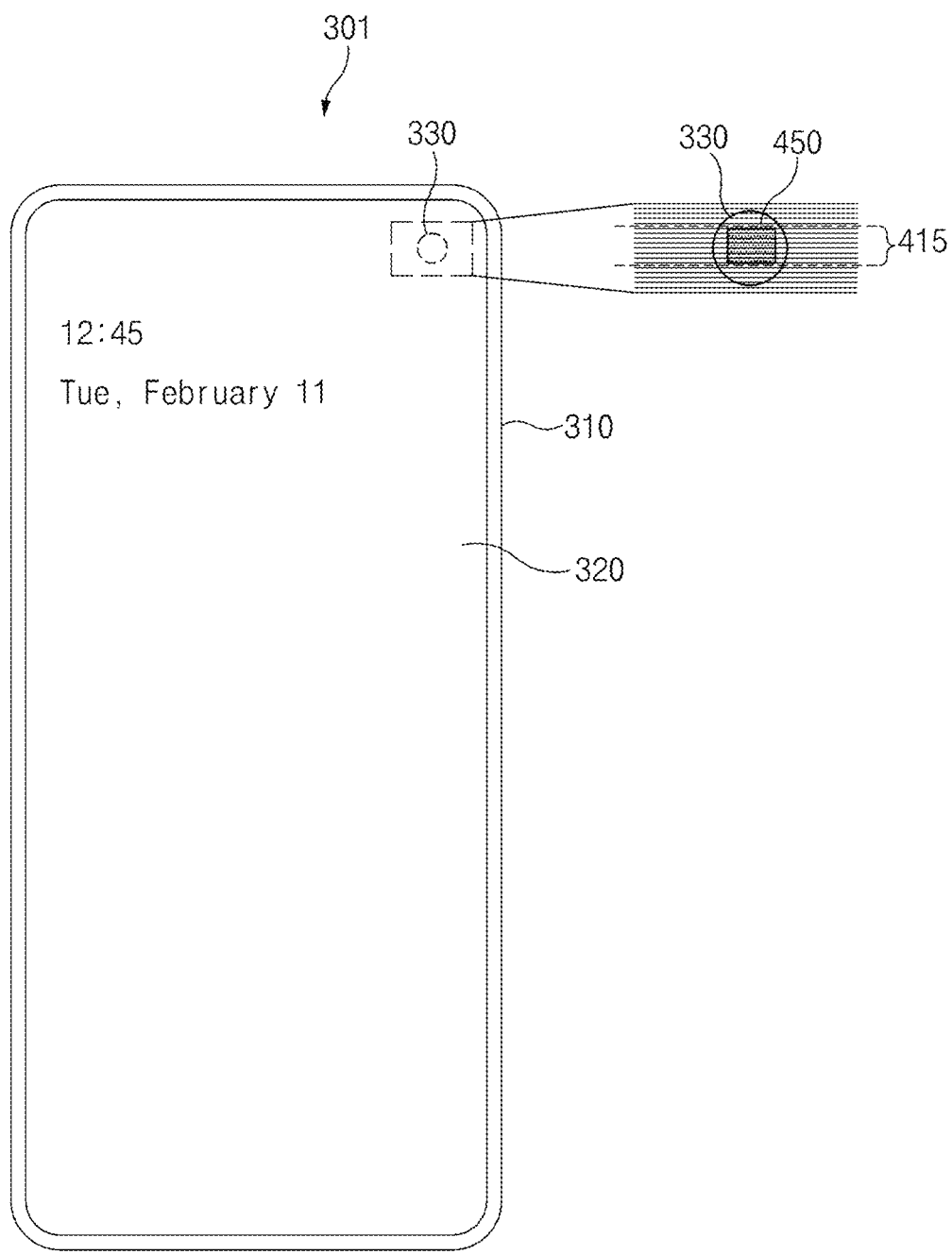
FIG. 3 illustrates an electronic device, according to various embodiments.

FIG. 3 illustrates an electronic device 301, according to various embodiments.

Referring to FIG. 3, the electronic device 301 (e.g., the electronic device 101 of FIG. 1) may include a body part 310, a display 320 (e.g., the display module 160 of FIG. 1), and a camera module 330 (e.g., the camera module 180 of FIG. 1 or 2).

According to various embodiments, the body part (or housing) 310 may include various configurations necessary for an operation of the electronic device 301. For example, the body part 310 may include various configurations such as a board (e.g., a printed circuit board (PCB), a flexible PCB (FPCB), or a rigid-flexible PCB (RFPCB)), a processor (e.g., the processor 120 of FIG. 1), a memory (e.g., the memory 130 of FIG. 1), or a communication module (e.g., the communication module 190 of FIG. 1) therein.

According to various embodiments, the display 320 may be disposed on a first surface (e.g., a front surface) of the body part 310. The display 320 may be a full front display, and may have no bezel or a minimized shape. The display 320 may display various pieces of content such as texts or images. The display 320 may allow light to pass through at least some regions in which the camera module 330 is disposed. For example, the display 320 may allow light coming from the outside to pass through empty space between pixels.

According to various embodiments, the display 320 may be composed of a plurality of layers. For example, the display 320 may have a structure in which a window layer, a touch screen panel, a display panel, and/or a protective layer are sequentially stacked. The display panel inside the display 320 may composed of a plurality of display lines (or pixel lines). The plurality of display lines of the display panel may be driven depending on a specified frame rate and emission/non-emission cycle (or a duty cycle).

According to various embodiments, when the camera module 330 is used to measure illuminance, light output from the display lines may be entered into the image sensor in some lines (hereinafter, referred to as overlapping lines) 415 among the plurality of display lines, thereby affecting illuminance measurement. For example, the overlapping lines 415 may be lines arranged in a first region (a partial region of the display 320 overlapping the image sensor 450, when viewed from the front surface of the electronic device 301), which is an upper surface disposed on the sensing surface of the image sensor 450 or may be lines arranged in a second region partially extended from the first region. According to an embodiment, the overlapping lines 415 may be lines arranged in a region corresponding to an opening of the camera module 330 for receiving light. According to various embodiments, the electronic device 301 may adjust the exposure timing or readout timing of the image sensor 450 (see FIGS. 4 to 10) so as to prevent light from the overlapping lines 415 from entering the image sensor 450 inside the camera module 330.

The camera module (or a camera device) 330 may be disposed to face a first surface (e.g., a front surface) of the body part 310. The camera module 330 may be a UDC (or a camera disposed under a display). The camera module 330 may be disposed under the display panel included in the display 320 (may be disposed on a surface opposite to a surface on which an image is displayed). The camera module 330 may be in a hidden shape so as to make it difficult for a user to be visually perceived from the outside.

According to an embodiment, the camera module 330 may be mounted in a region from which at least some layers included in the display 320 are removed. For example, a layer (e.g., a shielding layer) through which external light is incapable of passing may be removed, and a lens part of the camera module 330 may be disposed in a region in which the layer is removed.

The camera module 330 may include the image sensor 450 therein. The image sensor 450 may obtain image data by using light passing through space between the overlapping lines 415 in the display 320. When illuminance is measured by using the camera module 330, the exposure timing or readout timing of the image sensor 450 may be adjusted to correspond to the non-emission time of the overlapping lines 415 (refer to FIGS. 4 to 9).

Figure 4:
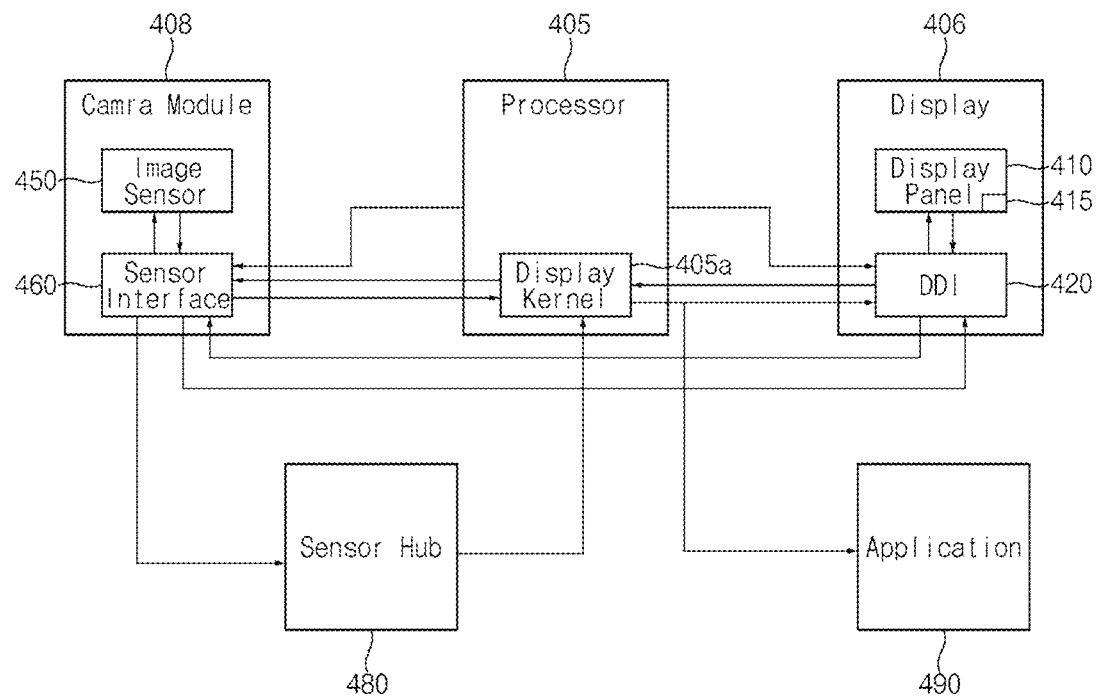
FIG. 4 illustrates a block diagram of an electronic device, according to various embodiments.

FIG. 4 illustrates a block diagram of an electronic device, according to various embodiments. FIG. 4 mainly illustrates a configuration for measuring illuminance by using the camera module 330, but is not limited thereto.

Referring to FIG. 4, the electronic device 301 may include a processor (e.g., the processor 120 of FIG. 1) 405, a display 406 (e.g., the display module 160 of FIG. 1 or the display 320 of FIG. 3), and a camera module 408 (e.g., the camera module 180 of FIG. 1 or 2 or the camera module 330 of FIG. 3).

The processor 405 may control the display 406. For example, the processor 405 may transmit a control signal for driving a display panel 410 at a specified frame rate (alternatively, an operating frequency, a refresh rate, or a scan rate) to a display driver integrated circuit (hereinafter referred to as "DDI") 420. The processor 405 may transmit image data, which is to be output through the display panel 410, to the DDI 420.

The processor 405 may also control the camera module 408. For example, the processor 405 may obtain image data through the camera module 408 and then may store an image based on the image data or output the image to the display 406.

According to various embodiments, the processor 405 may measure ambient illuminance by using the camera module 408. For example, the processor 405 may transmit/receive information or a control signal (e.g., an exposure activation signal of an image sensor 450 or an emission activation signal of the display panel 410) associated with illuminance measurement with the display 406 or the camera module 408 through a display kernel 405a. For the illuminance measurement, the processor 405 may simultaneously control the display 406 or the camera module 408.

According to various embodiments, the processor 405 may transmit brightness information of the display panel 410 to the camera module 408 through the display kernel 405a. The camera module 408 may store, in advance, the exposure time of the image sensor 450 for the brightness of the display panel 410 and a region (hereinafter referred to as a region-of-interest (ROI)) used for illuminance output as a lookup table (LUT) corresponding to each brightness value. The camera module 408 may determine the exposure time and information (e.g., an exposure time, gains, binning settings) associated with the ROI by using the received brightness information (see FIGS. 5 and 6).

According to various embodiments, when illuminance is measured by using the camera module 408, the processor 405 may receive the measured illuminance value through a sensor hub 480. The processor 405 may control brightness of the display 406 by using the received illuminance value. Furthermore, the processor 405 may use the received illuminance value to execute various applications 490.

The display 406 may include the display panel 410 and the DDI 420.

The display panel 410 may display various pieces of content such as images or texts. The display panel 410 may composed of a plurality of display lines (or pixel lines). The plurality of display lines of the display panel 410 may be driven depending on a specified frame rate and emission/non-emission cycle (or a duty cycle) (see FIG. 6).

The DDI 420 may drive the display panel 410 depending on the control signal of the processor 405. The DDI 420 may drive the display panel 410 at a frame rate (e.g., 60 Hz or 120 Hz) according to the control signal.

According to an embodiment, when illuminance is measured by using the camera module 408, the DDI 420 may receive the control signal associated with a change in frame rate. The DDI 420 may drive the display panel 410, which is being driven at a first frame rate, at a second frame rate in response to the control signal. For example, in the non-emission section of a display line, the second frame rate may be longer than the first frame rate so as to be advantageous for illuminance measurement.

While the DDI 420 outputs one frame through the display panel 410, the DDI 420 may drive each display line (or pixel line) constituting the display panel 410 in a plurality of cycles. For example, for an operation at 60 Hz, while the DDI 420 outputs one frame for 16.67 ms, the DDI 420 may make the display line repeat emission/non-emission in 4 cycles. Under the condition that the voltage for driving the display panel 410 is not changed, as an emission section increases in each cycle (as a non-emission section decreases), the brightness of the display panel 410 may be increased (see FIG. 6).

According to an embodiment, the DDI 420 may drive the entire region of the display panel 410. According to another embodiment, the plurality of DDIs 420 may be present. The DDI 420 may include a first driver for driving the overlapping lines 415 for illuminance measurement and a second driver for driving the remaining display lines.

According to various embodiments, when the overlapping lines 415 are controlled through a separate driver, brightness may be compensated depending on the degree (brightness change) of deterioration of a region where the camera module 408 is positioned. Besides, the overlapping lines 415 may be controlled at timing advantageous for illuminance measurement, and the remaining display lines may be controlled at a general timing.

According to various embodiments, the DDI 420 may transmit a synchronization signal to the camera module 408. For example, the synchronization signal may include a non-emission timing (turn-off timing) of a first line (a start line) among the overlapping lines 415.

The camera module 408 may obtain image data by using the image sensor 450. When the camera module 408 is used to measure illuminance, the camera module 408 may perform exposure in synchronization with the non-emission timing of the overlapping lines 415.

According to an embodiment, the camera module 408 may include the image sensor 450 and a sensor interface 460. The image sensor 450 may convert light into an electrical signal. The image sensor 450 may obtain image data by reading out data of each pixel. The exposure time of the image sensor 450 may be synchronized with the non-emission timing of the overlapping lines 415.

The sensor interface 460 may receive brightness information transmitted from the processor 405 or a synchronization signal associated with the non-emission section transmitted from the display 406 and then may deliver the brightness information and the synchronization signal to the image sensor 450. The sensor interface 460 may transmit image data, which is generated through the image sensor 450, to the sensor hub 480.

According to various embodiments, the sensor interface 460 may remove (or crop) or scale down a part of image data under a specified condition so as to be transmitted to the sensor hub 480.

The sensor hub 480 may receive data (e.g., image data or capture information (gain or shutter speed)), which is generated through the image sensor 450 and which is used to measure illuminance. The sensor hub 480 may calculate an illuminance value through calculation. The sensor hub 480 may transmit the calculated illuminance value to the processor 405.

Figure 5:
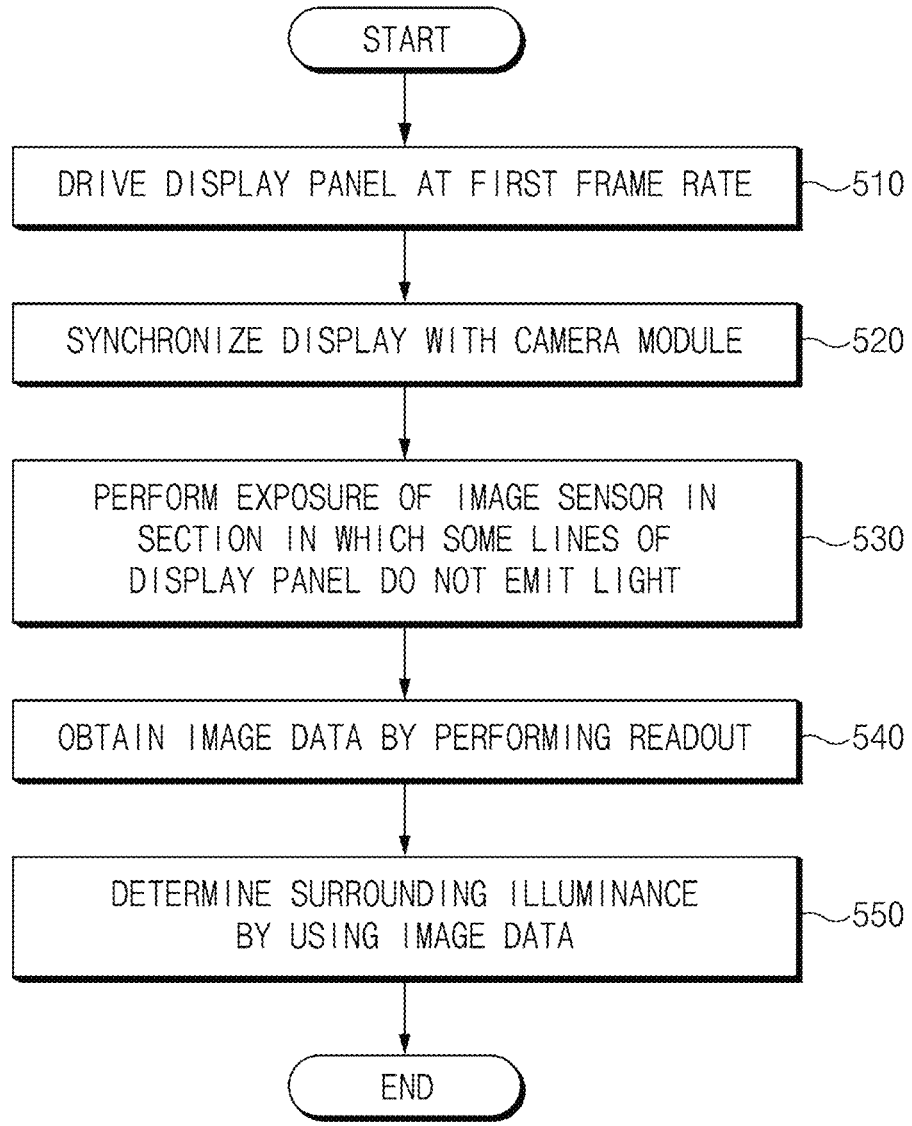
FIG. 5 illustrates an illuminance measuring method by using a camera module, according to various embodiments.

FIG. 5 illustrates an illuminance measuring method by using a camera module, according to various embodiments.

Referring to FIG. 5, in operation 510, the processor 405 may drive the display panel 410 at a first frame rate (e.g., 60 Hz). The processor 405 may transmit a control signal to the DDI 420 so as to drive the display panel 410 at the first frame rate (e.g., 60 Hz).

According to various embodiments, the processor 405 may drive the display panel 410 in a plurality of cycles to output one frame corresponding to the first frame rate. For example, while the processor 405 outputs one frame, the processor 405 may allow each line constituting the display panel 410 to repeat emission/non-emission in N cycles (e.g., 4 times). When a ratio of an emission section increases in each cycle and other driving conditions are the same, the brightness of the display panel 410 may be increased.

In operation 520, the processor 405 may synchronize the display 406 with the camera module 408. The processor 405 may transmit information or a control signal, which is associated with illuminance measurement, to the display 406 or the camera module 408. The DDI 420 of the display 406 may transmit information about a non-emission section of the overlapping lines 415 to the sensor interface 460 of the camera module 408.

According to various embodiments, the processor 405 may transmit an ROI, which is used for the exposure time and illuminance output of the image sensor 450 corresponding to the brightness of the display panel 410, to an LUT and then may store the ROI in the camera module 408.

According to various embodiments, the processor 405 may transmit brightness information of the display panel 410 to the camera module 408. The camera module 408 may determine the exposure time and information (e.g., an exposure time, gains, or binning settings) associated with an ROI by using the received brightness information and the LUT.

According to various embodiments, the processor 405 may monitor a change in brightness of the display panel 410. When the brightness of the display panel 410 is changed, the processor 405 may deliver the changed brightness information to the camera module 408.

In operation 530, the processor 405 may allow the image sensor 450 to perform exposure in a section in which some lines of the display panel 410 do not emit light. Some lines may correspond to the overlapping lines 415.

In operation 540, the image sensor 450 of the camera module 408 may obtain image data according to exposure by performing readout. For a rolling shutter, the readout may be performed after exposure of each line of an image sensor is completed. For a global shutter, the readout may be performed after exposure of all lines (or all lines included in an ROI) of the image sensor is finished. According to an embodiment, the image sensor 450 may perform readout according to a control signal of an image signal processor (ISP) (e.g., the ISP of FIG. 2) of the camera module 408 or the processor 405.

In operation 550, the camera module 408, the processor 405, or a separate sub-processor (e.g., a sensor hub) may determine surrounding illuminance by using image data.

According to an embodiment, the ISP (e.g., the ISP of FIG. 2) of the camera module 408 or the processor 405 may calculate an illuminance value by using the image data.

For example, the ISP of the camera module 408 or the processor 405 may determine an exposure value (EV) from an image captured by the camera module 408 and may determine the illuminance value by using an EV-Lux table as shown in Table 1 below.

TABLE 1

| EV | Lux |
|---|---|
| −1 | 1.25 |
| −0.5 | 1.75 |
| 0 | 2.5 |
| 0.5 | 3.5 |
| 1 | 5 |
| 1.5 | 7 |
| 2 | 10 |
| 2.5 | 14 |
| 3 | 20 |
| 3.5 | 28 |
| 4 | 40 |
| 4.5 | 56 |
| 5 | 80 |
| 5.5 | 112 |
| 6 | 160 |
| 6.5 | 225 |
| 7 | 320 |
| 7.5 | 450 |
| 8 | 640 |
| 8.5 | 900 |
| 9 | 1280 |
| 9.5 | 1800 |
| 10 | 2600 |
| 10.5 | 3600 |
| 11 | 5120 |
| 11.5 | 7200 |
| 12 | 10240 |
| 12.5 | 14400 |
| 13 | 20480 |
| 13.5 | 28900 |
| 14 | 40960 |
| 14.5 | 57800 |
| 15 | 81900 |
| 15.5 | 116000 |
| 16 | 164000 |
| 16.5 | 232000 |
| 17 | 328000 |
| 17.5 | 464000 |
| 18 | 656000 |

According to another embodiment, the camera module 408 may scale down the image data obtained from the image sensor 450 so as to be delivered to the sensor hub 480 or the processor 405. The sensor hub 480 or the processor 405 may receive data (e.g., image data or capture information (a gain or a shutter speed), which is generated through the image sensor 450 and which is used to measure illuminance. The sensor hub 480 or the processor 405 may calculate an illuminance value through calculation.

According to various embodiments, the processor 405 may adjust the brightness of the display panel 410 by using the calculated illuminance value or may use the calculated illuminance value in various applications.

According to various embodiments, the camera module 408 (an ISP or the image sensor 450) may set brightness information to a reference value in a non-emission section of the overlapping lines 415 and may set the brightness information at a point in time when light (from visible light of a display or a separate infrared light source) having specific brightness is emitted around the camera module 408, to a detection value. When a difference between the reference value and the detection value is more than a specific value, it may be determined that an external object is approached.

Figure 6:
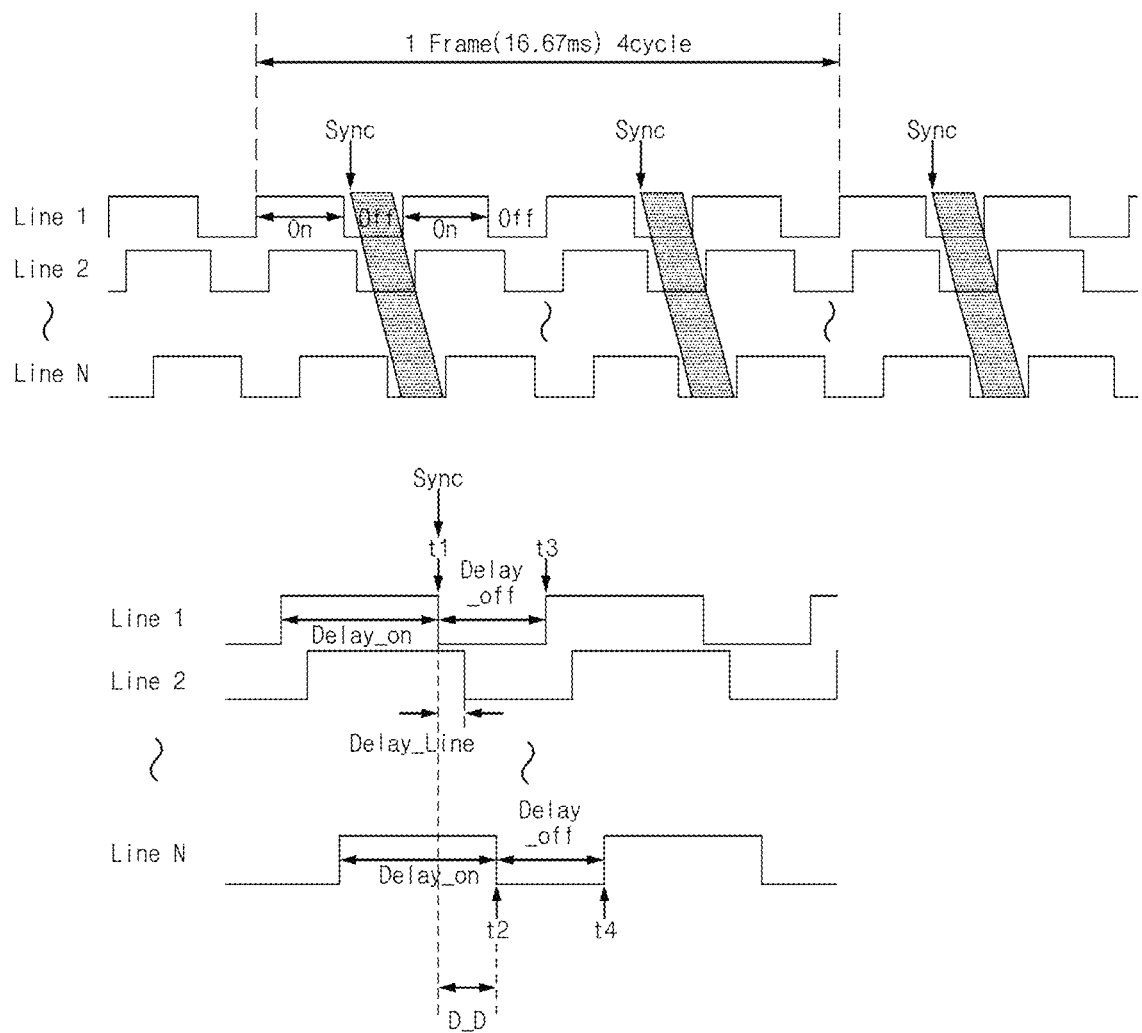
FIG. 6 illustrates driving of a display panel, according to various embodiments.

FIG. 6 illustrates driving of a display panel, according to various embodiments. FIG. 6 illustrates that a frame rate is 60 Hz and one frame is driven at 4 cycles. However, embodiments are not limited thereto. The number of cycles may be changed depending on characteristics or driving conditions of the display panel 410.

Referring to FIG. 6, the DDI 420 may drive the display panel 410 at a specified frame rate (e.g., 60 Hz). While the display panel 410 outputs one frame, the display panel 410 may be driven in a plurality of cycles so as to repeat emission/non-emission. For example, while outputting one frame, the display panel 410 may operate in 4 emission/non-emission cycles (or duty cycles). Each cycle may include an emission section (Disp_on) and a non-emission section (Disp_off). Overlapping lines (Line 1 to Line N) of the display panel 410 may output data by repeating emission/non-emission depending on a control signal of the DDI 420.

According to various embodiments, the processor 405 may control the brightness of the display panel 410. The processor 405 may change the brightness of the display panel 410 by transmitting the control signal to the DDI 420. The DDI 420 may change the brightness of the display panel 410 by changing the ratio of the emission section (Disp_on) to the non-emission section (Disp_off) in one cycle.

For example, under the condition that the luminance of the display panel 410 is 200 cd/m$^2$, the display panel 410 may be driven at a rate of the non-emission section (Disp_off) having 35.02% in 4 cycles. Accordingly, one cycle may be 4.17 ms (=16.67 ms/4). The emission section (Disp_on) may be 2.71 ms (=4.17 ms*64.98/100). The non-emission section (Disp_off) may be 1.46 ms (=4.17 ms*35.02/100).

A delay (hereinafter, referred to as a "line delay") (Delay_Line) according to the sequential driving for each line of the display panel 410 may occur in each display line. The line delay (Delay_Line) may be determined depending on the resolution or frame rate of the display panel 410.

According to various embodiments, in a timing diagram of FIG. 6, each of the overlapping lines (Line 1 to Line N) may operate depending on a non-emission start time (or a turn-off time) and a non-emission end time (or a turn-on time). For example, a first line (or the start line) may be turned off at a first time t1, and an N-th line (or the last line) may be turned off at a second time t2. A difference between the first time t1 and the second time t2 may be the same as a display delay time D_D. The display delay time D_D may be a line delay (Delay_Line)*N (the number of overlapping lines).

The first line may be turned on at a third time t3, and the N-th line may be turned on at a fourth time t4. The difference between the third time t3 and the fourth time t4 may be the same as the display delay time D_D. The display delay time D_D may be the line delay (Delay_Line)*N (the number of overlapping lines).

The non-emission section Disp_off of the first line (Line 1) may be from the first time t1 to the third time t3. The non-emission section Disp_off of the N-th line (Line N) may be from the second time t2 to the fourth time t4.

According to various embodiments, the non-emission section Disp_off may be calculated through a frame rate, a ratio of a non-emission section, and the number of cycles of the display panel 410. For example, the non-emission section Disp_off may be calculated as "((1/operating frequency)/number of cycles)*non-emission section ratio)".

According to various embodiments, the DDI 420 may transmit a synchronization signal Sync to the sensor interface 460. The camera module 408 may set the exposure timing of the image sensor 450 by using the synchronization signal Sync so as to correspond to the non-emission section Disp_off of the overlapping lines (Line 1 to Line N) of the display panel 410. In this way, light output from the overlapping lines (Line 1 to Line N) may be prevented from entering the image sensor 450, and the image sensor 450 may receive only the light from an external light source. Accordingly, the accuracy of illuminance measurement may be increased (see FIG. 7).

According to various embodiments, the synchronization signal Sync may include information about the first time t1, which is a turn-off time of the first line (Line 1). The camera module 408 may perform exposure by calculating the second time t2 that is a turn-off time of the N-th line (Line N) at the first time t1. The camera module 408 may receive the line delay Delay_Line and the number of overlapping lines (N) from the processor 405, may reflect the line delay Delay_Line and the number of overlapping lines (N) at the first time t1, and may calculate the second time t2. The camera module 408 may change the exposure time of the image sensor 450 in response to the brightness of the display panel 410 by using information received from the processor 405.

According to various embodiments, the camera module 408 may obtain image data in some cycles. For example, among 4 cycles constituting one frame, image data for illuminance measurement may be obtained in a first cycle and a third cycle, and image data for illuminance measurement may not be obtained in a second cycle and a fourth cycle.

Figure 7:
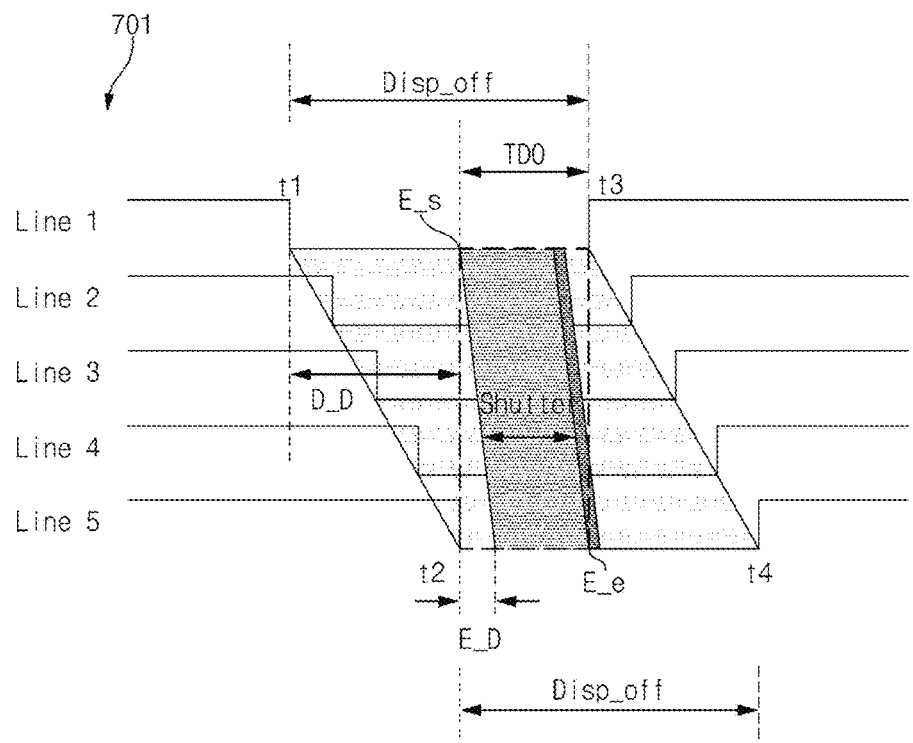
FIG. 7 illustrates exposure timing, according to various embodiments.
Figure 7:
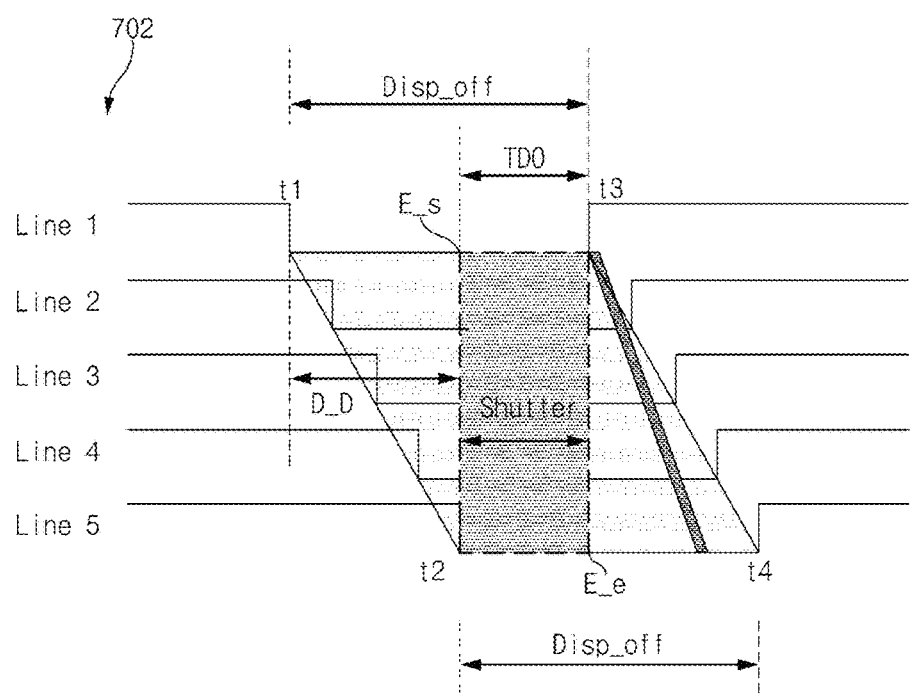

FIG. 7 illustrates exposure timing, according to various embodiments. FIG. 7 illustrates that the number of overlapping lines is five. However, embodiments may not be limited thereto.

Referring to FIG. 7, each of overlapping lines (Line 1 to Line 5) may operate depending on a non-emission start time and a non-emission end time.

For example, the first line (Line 1), which is a start line, may be turned off at the first time t1. The fifth line (Line 5), which is a last line, may be turned off at the second time t2. The first line may be turned on at the third time t3. The fifth line may be turned on at the fourth time t4.

The non-emission section Disp_off of the first line (Line 1) may be from the first time t1 to the third time t3. The non-emission section Disp_off of the fifth line (Line 5) may be from the second time t2 to the fourth time t4.

According to various embodiments, the second time t2 may be determined by the first time t1. The second time t2 may be determined as "the first time t1+a display delay time D_D". Herein, the display delay time D_D may be "the line delay Delay_Line*N (the number of overlapping lines)" in FIG. 6.

The display delay time D_D may occur between the first line (Line 1) and the fifth line (Line 5) by the driving method updated in units of lines of the display panel 410. The display delay time D_D may vary depending on the resolution and frame rate of the display panel 410.

According to various embodiments, the total non-emission section (total display off (TDO)) may be a section in which all overlapping lines (Line 1 to Line 5) are in a non-emission state. The total non-emission section TDO may be started at the first time t1 after the display delay time D_D has elapsed. The total non-emission section TDO may be a section between the second time t2 and the third time t3.

In a timing diagram 701 of a rolling shutter, for a rolling shutter, an exposure start time for each line of the image sensor 450 may be different from each other. Accordingly, an exposure delay E_D may occur. When the exposure is terminated for each line, the readout of each line may be started.

The exposure of the image sensor 450 may be performed within the total non-emission section TDO. An exposure start time E_s may be after the second time t2 that is a turn-off time of the fifth line (Line 5). An exposure end time E_e may be before the third time t3 that is a turn-on time of the first line (Line 1).

According to various embodiments, the exposure delay E_D may be defined by an operating frequency or a frame length line. An ROI and operating frequency may be adjusted such that ROI data is completely obtained within an exposure time.

In a timing diagram 702 of a global shutter, for a global shutter, the exposure start time and exposure end time of all lines of the image sensor 450 may be the same. Accordingly, the exposure delay may not occur. Exposure of all regions of the image sensor 450 is performed at the same time, and then readout may be started.

The exposure of the image sensor 450 in the global shutter may be performed within the total non-emission section TDO. The exposure start time E_s may be after the second time t2 that is a turn-off time of the fifth line (Line 5). The exposure end time E_e may be before the third time t3 that is a turn-on time of the first line (Line 1).

Figure 8:
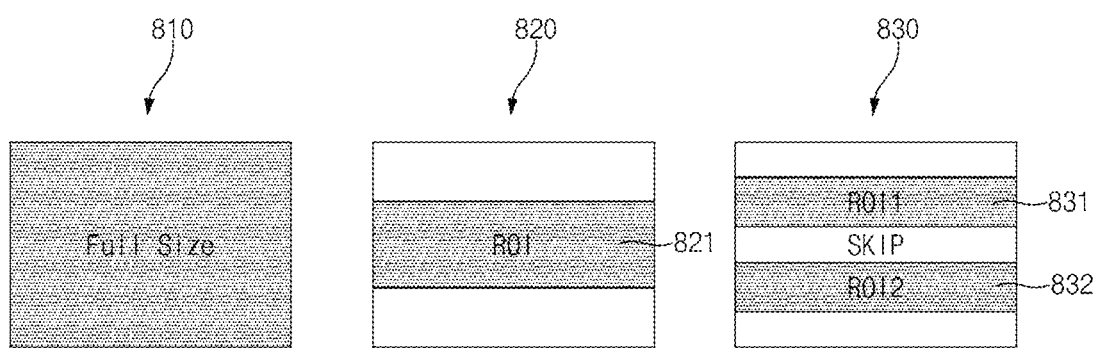
FIG. 8 illustrates an ROI of an image sensor, according to various embodiments.

FIG. 8 illustrates an ROI of an image sensor, according to various embodiments.

Referring to FIG. 8, the processor 405 may determine an ROI used for illuminance output in the image sensor 450.

According to an embodiment 810, the processor 405 may obtain image data from all regions of the image sensor 450. The image data may be used to calculate illuminance. When a non-emission section of the display panel 410 is long or an operation speed of the image sensor 450 is fast, the image data may be obtained from all regions of the image sensor 450.

According to another embodiment 820, the processor 405 may set a partial region (e.g., a central region) of the image sensor 450 to the ROI 821. Only the image data obtained from an ROI 821 may be used to calculate illuminance. When the non-emission section of the display panel 410 is short (when the brightness of the display panel 410 is bright), the image data may be quickly obtained from the ROI 821. The image sensor 450 may perform exposure and readout in only the ROI 821.

According to another embodiment 830, the processor 405 may set a plurality of sub-regions in the image sensor 450 to ROIs 831 and 832. Only the image data in the ROIs 831 and 832 may be used to calculate illuminance. For example, for the first ROI 831, the exposure and readout may be performed during the entire non-emission time of the first cycle. For the second ROI 832, the exposure and readout may be performed during the entire non-emission time of the second cycle.

Figure 9:
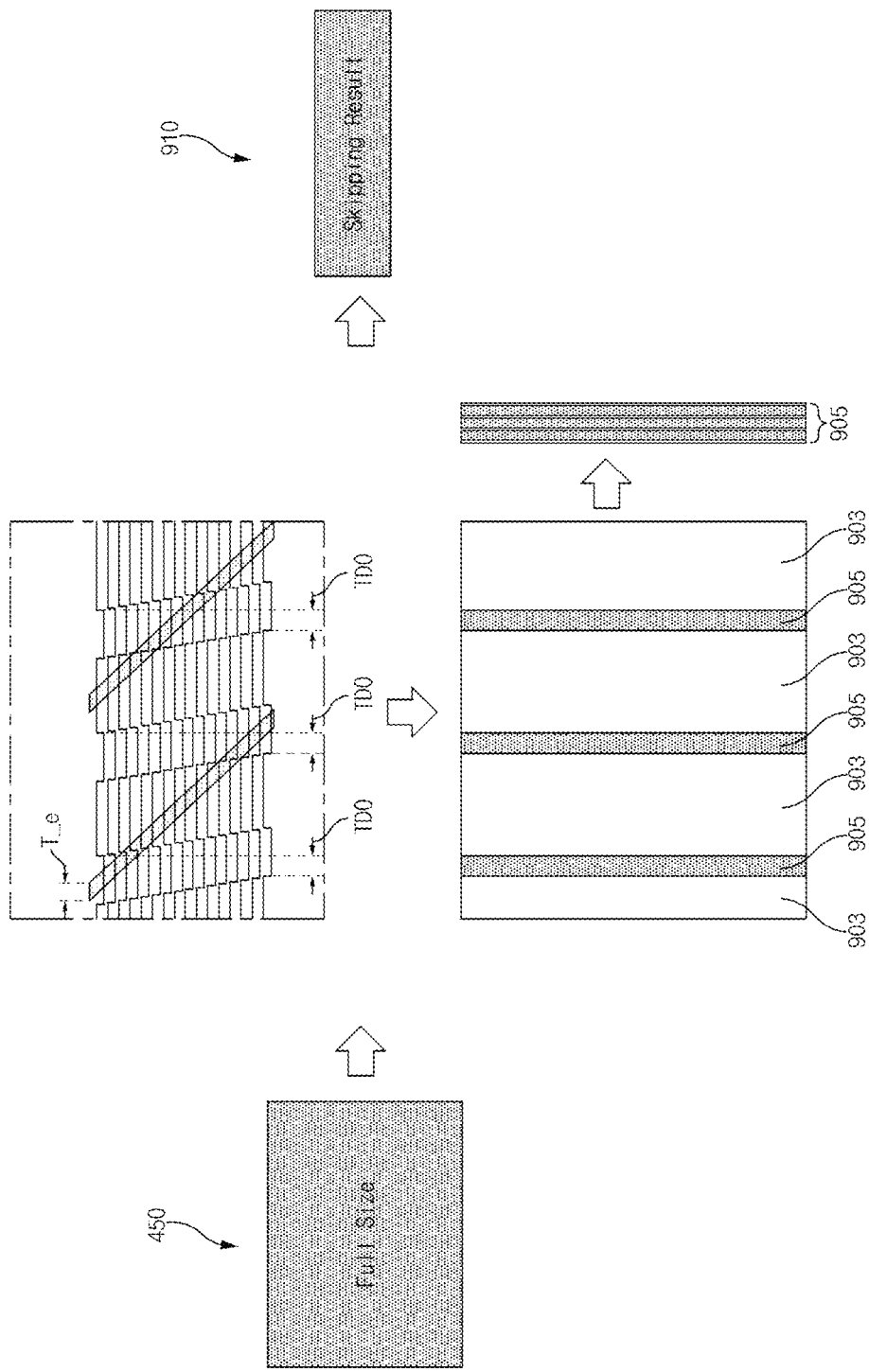
FIG. 9 illustrates cropping of image data, according to various embodiments.

FIG. 9 illustrates cropping of image data, according to various embodiments.

Referring to FIG. 9, the camera module 408 may obtain image data for illuminance measurement through the image sensor 450. According to various embodiments, exposure duration T_e in the image sensor 450 may be the same as the total non-emission section TDO, or may be shorter than the total non-emission section TDO.

The camera module 408 or the processor 405 may remove data 903, which corresponds to an emission section of the overlapping lines 415, from among the image data and then may crop and collect only data 905 corresponding to the total non-emission section TDO of the overlapping lines 415. The camera module 408 or the processor 405 may calculate illuminance by using only the cropped data 910.

According to various embodiments, an electronic device (e.g., the electronic device 101 of FIG. 1 or the electronic device 301 of FIG. 3) may include a camera module (e.g., the camera module 180 of FIGS. 1 and 2, the camera module 330 of FIG. 3, or the camera module 408 of FIG. 4) including an image sensor (e.g., the image sensor 230 of FIG. 2 or the image sensor 450 of FIGS. 3 and 4), a display panel (e.g., the display panel 410 of FIG. 4), a display driver integrated circuit (DDI) (e.g., the DDI 420 of FIG. 4) that drives the display panel (e.g., the display panel 410 of FIG. 4) at a first frame rate, a memory (e.g., the memory 130 of FIG. 1), and a processor (e.g., the processor 120 of FIG. 1 or the processor 405 of FIG. 4) operatively connected to the camera module (e.g., the camera module 180 of FIGS. 1 and 2, the camera module 330 of FIG. 3, or the camera module 408 of FIG. 4), the display panel (e.g., the display panel 410 of FIG. 4), the DDI (e.g., the DDI 420 of FIG. 4), and the memory (e.g., the memory 130 of FIG. 1). The DDI (e.g., the DDI 420 of FIG. 4) may drive the display panel (e.g., the display panel 410 of FIG. 4) in a plurality of cycles to output one frame corresponding to the first frame rate. The camera module (e.g., the camera module 180 of FIGS. 1 and 2, the camera module 330 of FIG. 3, or the camera module 408 of FIG. 4) may perform exposure of the image sensor (e.g., the image sensor 230 of FIG. 2 or the image sensor 450 of FIGS. 3 and 4) in a section, in which some lines among lines constituting the display panel (e.g., the display panel 410 of FIG. 4) do not emit light, in the plurality of cycles. The memory (e.g., the memory 130 of FIG. 1) may store instructions that, when executed, cause the processor (e.g., the processor 120 of FIG. 1 or the processor 405 of FIG. 4) to determine illuminance around the electronic device (e.g., the electronic device 101 of FIG. 1 or the electronic device 301 of FIG. 3) by using image data according to the exposure.

According to various embodiments, some lines are lines arranged in a first region, which is an upper surface disposed on a sensing surface of the image sensor (e.g., the image sensor 230 of FIG. 2 or the image sensor 450 of FIGS. 3 and 4), or lines arranged in a second region partially extended from the first region.

According to various embodiments, the DDI (e.g., the DDI 420 of FIG. 4) changes the first frame rate into a second frame rate depending on a control signal received from the processor (e.g., the processor 120 of FIG. 1 or the processor 405 of FIG. 4).

According to various embodiments, the instructions may cause the processor (e.g., the processor 120 of FIG. 1 or the processor 405 of FIG. 4) to transmit brightness information of the display panel (e.g., the display panel 410 of FIG. 4) to the camera module (e.g., the camera module 180 of FIGS. 1 and 2, the camera module 330 of FIG. 3, or the camera module 408 of FIG. 4).

According to various embodiments, the camera module (e.g., the camera module 180 of FIGS. 1 and 2, the camera module 330 of FIG. 3, or the camera module 408 of FIG. 4) may change a setting for the exposure based on the brightness information.

According to various embodiments, the brightness information may include information about a ratio of an emission section or a non-emission section of the plurality of cycles.

According to various embodiments, the DDI (e.g., the DDI 420 of FIG. 4) may transmit a synchronization signal including information about a first time, which is a non-emission start time of a start line among some lines, to the camera module (e.g., the camera module 180 of FIGS. 1 and 2, the camera module 330 of FIG. 3, or the camera module 408 of FIG. 4).

According to various embodiments, the camera module (e.g., the camera module 180 of FIGS. 1 and 2, the camera module 330 of FIG. 3, or the camera module 408 of FIG. 4) may determine a second time, which is a non-emission start time of a last line among some lines, at the first time and starts the exposure of the image sensor (e.g., the image sensor 230 of FIG. 2 or the image sensor 450 of FIGS. 3 and 4) at the second time.

According to various embodiments, the camera module (e.g., the camera module 180 of FIGS. 1 and 2, the camera module 330 of FIG. 3, or the camera module 408 of FIG. 4) may determines a third time, which is a non-emission end time of the start line, and ends the exposure of the image sensor (e.g., the image sensor 230 of FIG. 2 or the image sensor 450 of FIGS. 3 and 4) before the third time.

According to various embodiments, the camera module (e.g., the camera module 180 of FIGS. 1 and 2, the camera module 330 of FIG. 3, or the camera module 408 of FIG. 4) may obtain the image data in a partial region of the image sensor (e.g., the image sensor 230 of FIG. 2 or the image sensor 450 of FIGS. 3 and 4).

According to various embodiments, the camera module (e.g., the camera module 180 of FIGS. 1 and 2, the camera module 330 of FIG. 3, or the camera module 408 of FIG. 4) may perform the exposure and the readout in the partial region, and interrupts the exposure or the readout in a region other than the partial region.

According to various embodiments, the partial region may include a plurality of sub-regions that are separated from one another.

According to various embodiments, the instructions may cause the processor (e.g., the processor 120 of FIG. 1 or the processor 405 of FIG. 4) to change brightness of the display panel (e.g., the display panel 410 of FIG. 4) by using the determined illuminance or to reflect the determined illuminance to execution of an application.

According to various embodiments, the camera module (e.g., the camera module 180 of FIGS. 1 and 2, the camera module 330 of FIG. 3, or the camera module 408 of FIG. 4) or the processor (e.g., the processor 120 of FIG. 1 or the processor 405 of FIG. 4) may crop data, which corresponds to the section, from among the image data.

According to various embodiments, an electronic device (e.g., the electronic device 101 of FIG. 1 or the electronic device 301 of FIG. 3) may include a housing including a first surface, a display exposed through a first portion of the first surface, an image sensor (e.g., the image sensor 230 of FIG. 2 or the image sensor 450 of FIGS. 3 and 4) exposed through a partial region of the first portion of the first surface, and a processor (e.g., the processor 120 of FIG. 1 or the processor 405 of FIG. 4) electrically connected to the image sensor (e.g., the image sensor 230 of FIG. 2 or the image sensor 450 of FIGS. 3 and 4). The display may receive a display activation signal from the processor (e.g., the processor 120 of FIG. 1 or the processor 405 of FIG. 4). When light is emitted depending on receiving the display activation signal, each line may include a non-emission section. A start line (1st) of the partial region may not emit light at a first time point (t1). A last line (Nth) of the partial region may not emit light at a second time point (t2). The start line may emit light at a third time point (t3) after the first time point (t1) or second time point (t2). The last line (Nth) may emit light at a fourth time point (t4) after the third time point (t3). The image sensor (e.g., the image sensor 230 of FIG. 2 or the image sensor 450 of FIGS. 3 and 4) may receive an exposure activation signal from the processor (e.g., the processor 120 of FIG. 1 or the processor 405 of FIG. 4), may perform exposure from a fifth time point (t5) to a sixth time point (t6) in a first image region corresponding to the start line (1st) in the image sensor (e.g., the image sensor 230 of FIG. 2 or the image sensor 450 of FIGS. 3 and 4) depending on receiving the exposure activation signal, and may perform exposure from a seventh time point (t7) to an eighth time point (t8) in a second image region corresponding to the last line (Nth) in the image sensor (e.g., the image sensor 230 of FIG. 2 or the image sensor 450 of FIGS. 3 and 4). The first time point (t1) to fourth time point (t4), the fifth time point (t5), and the eighth time point (t8) may have a relationship of "the first time point (t1)<the second time point (t2)<the fifth time point (t5)<the eighth time point (t8)<the third time point (t3)<the fourth time point (t4)". The processor (e.g., the processor 120 of FIG. 1 or the processor 405 of FIG. 4) may measure illuminance around the electronic device (e.g., the electronic device 101 of FIG. 1 or the electronic device 301 of FIG. 3) based on an image obtained through the exposure.

According to various embodiments, the third time point (t3), and the fifth time point (t5) to the eighth time point (t8) may have a relationship of "the fifth time point (t5)<the seventh time point (t7)<the sixth time point (t6)<the eighth time point (t8)<the third time point (t3)".

According to various embodiments, the third time point (t3), and the fifth time point (t5) to the eighth time point (t8) may have a relationship of "the fifth time point (t5)=the seventh time point (t7)<the sixth time point (t6)=the eighth time point (t8)<the third time point (t3)".

According to various embodiments, the image sensor (e.g., the image sensor 230 of FIG. 2 or the image sensor 450 of FIGS. 3 and 4) may perform the exposure according to the exposure activation signal in a partial region.

According to various embodiments, the processor (e.g., the processor 120 of FIG. 1 or the processor 405 of FIG. 4) may determine the first time point (t1) to the eighth time point (t8) such that the exposure according to the exposure activation signal is performed in all regions of the image sensor (e.g., the image sensor 230 of FIG. 2 or the image sensor 450 of FIGS. 3 and 4).

According to various embodiments, an illuminance measuring method performed by an electronic device (e.g., the electronic device 101 of FIG. 1 or the electronic device 301 of FIG. 3) may include driving a display panel (e.g., the display panel 410 of FIG. 4) of the electronic device (e.g., the electronic device 101 of FIG. 1 or the electronic device 301 of FIG. 3) in a plurality of cycles to output one frame corresponding to a first frame rate, performing exposure of the image sensor (e.g., the image sensor 230 of FIG. 2 or the image sensor 450 of FIGS. 3 and 4) in a section, in which some lines among lines constituting the display panel (e.g., the display panel 410 of FIG. 4) do not emit light, in the plurality of cycles, obtaining image data according to the exposure by performing readout, and determining illuminance around the electronic device (e.g., the electronic device 101 of FIG. 1 or the electronic device 301 of FIG. 3) by using the image data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a camera including an image sensor;
a display panel including lines constituting the display panel;
a display driver integrated circuit (DDI) configured to drive the display panel at a first frame rate;
a memory; and
a processor operatively connected to the camera, the display panel, the DDI, and the memory,
wherein the DDI is configured to drive the display panel in a plurality of cycles to output one frame corresponding to the first frame rate,
wherein each cycle of the plurality of cycles includes an emission section and a non-emission section that are different for each of the lines constituting the display panel according to a line delay,
wherein the camera is configured to perform exposure of the image sensor while one or more lines among the lines constituting the display panel are in the non-emission sections,
wherein the one or more lines are lines arranged in a partial region of the display panel, the partial region of the display panel including a first region that is an upper surface disposed on a sensing surface of the image sensor, wherein remaining lines, among the lines constituting the display panel, are arranged in a region other than the partial region of the display panel, wherein the memory stores instructions that, when executed, cause the processor to determine illuminance around the electronic device using image data according to the exposure, wherein the DDI is configured to transmit, to the camera, a synchronization signal including information about a first time, wherein the first time corresponds to a non-emission start time of a start line among the one or more lines, and wherein the camera is configured to:
determine, at the first time, a second time, wherein the second time corresponds to a non-emission start time of a last line among the one or more lines; and
begin the exposure of the image sensor at the second time.

2. The electronic device of claim 1, wherein the partial region of the display panel includes the first region and a second region, wherein the second region is partially extended from the first region.

3. The electronic device of claim 1, wherein the DDI changes the first frame rate into a second frame rate based on a control signal received from the processor.

4. The electronic device of claim 1, wherein the instructions cause the processor to:
transmit brightness information of the display panel to the camera.

5. The electronic device of claim 4, wherein the camera is configured to change a setting for the exposure based on the brightness information.

6. The electronic device of claim 4, wherein the brightness information includes information on a ratio of an emission section or a non-emission section of the plurality of cycles.

7. The electronic device of claim 1, wherein the camera is configured to:
determine a third time, wherein the third time is a non-emission end time of the start line, and
conclude the exposure of the image sensor before the third time.

8. The electronic device of claim 1, wherein the camera is configured to obtain the image data in a partial region of the image sensor.

9. The electronic device of claim 8, wherein the camera is configured to perform the exposure and a readout in the partial region of the image sensor, and
interrupt the exposure or the readout in a region other than the partial region of the image sensor.

10. The electronic device of claim 8, wherein the partial region of the image sensor includes a plurality of sub-regions that are separated from one another.

11. The electronic device of claim 1, wherein the instructions cause the processor to:
change brightness of the display panel using the determined illuminance; or
reflect the determined illuminance to execution of an application.

12. The electronic device of claim 1, wherein the camera or the processor crops data, which corresponds to the non-emission section of the lines arranged in the partial region, from among the image data.

13. An electronic device comprising:
a housing including a first surface;
a display exposed through a first portion of the first surface;
an image sensor exposed through a partial region of the first portion of the first surface; and
a processor operably connected to the image sensor and the display,
wherein the display is configured to:
receive a display activation signal from the processor,
in response to receiving the display activation signal, emit light, wherein when light is emitted, each line includes a non-emission section,
wherein a start line (1st) of the partial region does not emit light at a first time point (t1) and emits light at a third time point (t3) after the first time point (t1) or a second time point (t2),
wherein a last line (Nth) of the partial region does not emit light at the second time point (t2) and emits light at a fourth time point (t4) after the third time point (t3),
wherein the image sensor is configured to:
receive an exposure activation signal from the processor;
in response to receiving the exposure activation signal, perform exposure from a fifth time point (t5) to a sixth time point (t6) in a first image region corresponding to the start line (1st) in the image sensor; and
perform exposure from a seventh time point (t7) to an eighth time point (t8) in a second image region corresponding to the last line (Nth) in the image sensor,
wherein the processor is configured to measure illuminance around the electronic device based on an image obtained through the exposure, and
wherein the first time point (t1)<the second time point (t2)<the fifth time point (t5)<the eighth time point (t8)<the third time point (t3)<the fourth time point (t4).

14. The electronic device of claim 13, wherein the fifth time point (t5)<the seventh time point (t7)<the sixth time point (t6)<the eighth time point (t8)<the third time point (t3).

15. The electronic device of claim 13, wherein the fifth time point (t5)=the seventh time point (t7)<the sixth time point (t6)=the eighth time point (t8)<the third time point (t3).

16. The electronic device of claim 13, wherein the image sensor is further configured to perform the exposure according to the exposure activation signal in the partial region.

17. The electronic device of claim 13, wherein the processor is configured to determine the first time point (t1) to the eighth time point (t8) such that the exposure according to the exposure activation signal is performed in all regions of the image sensor.

18. An illuminance measuring method performed by an electronic device, the method comprising:
driving a display panel of the electronic device in a plurality of cycles to output one frame corresponding to a first frame rate, the display panel including lines constituting the display panel, each cycle including an emission section and a non-emission section that are different for each of the lines constituting the display panel according to a line delay;
performing exposure of an image sensor while one or more lines among the lines constituting the display panel are in the non-emission sections,
wherein the one or more lines are lines arranged in a partial region of the display panel, the partial region of the display panel including a first region that is an upper surface disposed on a sensing surface of the image sensor,
wherein remaining lines, among the lines constituting the display panel, are arranged in a region other than the partial region of the display panel; and determining illuminance around the electronic device using image data according to the exposure, transmitting, to a camera, a synchronization signal including information about a first time, wherein the first time corresponds to a non-emission start time of a start line among the one or more lines, and determining, at the first time, a second time, wherein the second time corresponds to a non-emission start time of a last line among the one or more lines; and beginning the exposure of the image sensor at the second time.

19. The illuminance measuring method of claim 18, wherein driving the display panel comprises:

driving, by a first driver, the one or more lines arranged in a partial region of the display panel; and driving, by a second driver, the remaining lines.

\* \* \* \* \*